(12) United States Patent
Fukami (10) Patent No.: US 11,015,569 B2
(45) Date of Patent: May 25, 2021

(54) VORTEX GENERATOR, WIND TURBINE BLADE, AND WIND TURBINE POWER GENERATING APPARATUS

(71) Applicant: MITSUBISHI HEAVY INDUSTRIES, LTD., Tokyo (JP)

(72) Inventor: Koji Fukami, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 16/370,206

(22) Filed: Mar. 29, 2019

(65) Prior Publication Data

US 2019/0226446 A1 Jul. 25, 2019

Related U.S. Application Data

(63) Continuation-in-part of application No. 15/217,949, filed on Jul. 22, 2016, now Pat. No. 10,330,077.

(30) Foreign Application Priority Data

Nov. 12, 2015 (JP) ................................ 2015-221838

(51) Int. Cl.
*F03D 1/06* (2006.01)

(52) U.S. Cl.
CPC ...... *F03D 1/0633* (2013.01); *F05B 2240/221* (2013.01); *F05B 2240/30* (2013.01); *F05B 2250/141* (2013.01); *F05B 2250/711* (2013.01)

(58) Field of Classification Search
None
See application file for complete search history.

(56) References Cited

U.S. PATENT DOCUMENTS

| 5,058,837 | A | 10/1991 | Wheeler |
| 6,837,465 | B2* | 1/2005 | Lisy .......................... B64C 3/58 |
| | | | 244/204.1 |
| 7,914,259 | B2 | 3/2011 | Godsk |
| 8,162,590 | B2 | 4/2012 | Haag |
| 8,419,373 | B1 | 4/2013 | Fukami |
| 9,303,621 | B2 | 4/2016 | Fuglsang et al. |
| 9,562,513 | B2* | 2/2017 | Tobin ................... F03D 1/0675 |

(Continued)

FOREIGN PATENT DOCUMENTS

| DE | 102013201871 A1 | 8/2014 |
| DE | 102013210733 A1 | 12/2014 |

(Continued)

OTHER PUBLICATIONS

M.O.L Hansen, "Aerodynamically shaped vortex generators", Wind Energy (2015), 2015 John Wiley & Sons, Ltd; 5pp.

(Continued)

*Primary Examiner* — David Hamaoui
*Assistant Examiner* — Jason Fountain
(74) *Attorney, Agent, or Firm* — Kanesaka Berner and Partners LLP (57) ABSTRACT

A vortex generator for a wind turbine blade to be mounted to a wind turbine blade includes: a platform portion to be mounted to a surface of the wind turbine blade; and at least one fin disposed upright on the platform portion. The platform portion has a cross section having a curved convex shape, at least along a blade spanwise direction of the wind turbine blade.

15 Claims, 7 Drawing Sheets

(56) References Cited

U.S. PATENT DOCUMENTS

| | | |
|---|---|---|
| 9,759,186 B2 | 9/2017 | Grabau et al. |
| 9,869,297 B2 | 1/2018 | Tobin et al. |
| 2011/0142673 A1 | 6/2011 | Fang et al. |
| 2012/0201689 A1 | 8/2012 | Fuglsang et al. |
| 2012/0257977 A1* | 10/2012 | Jensen ............... F03D 1/0608 416/223 R |
| 2012/0282105 A1 | 11/2012 | Grife et al. |
| 2013/0129520 A1 | 5/2013 | Enevoldsen et al. |
| 2014/0140856 A1 | 5/2014 | Madsen et al. |
| 2014/0328687 A1* | 11/2014 | Tobin ............... F03D 1/0633 416/174 |
| 2015/0010407 A1* | 1/2015 | Zamora Rodriguez ............... F03D 1/0633 416/236 R |
| 2015/0322791 A1 | 11/2015 | Flach |
| 2016/0017864 A1 | 1/2016 | Grabau et al. |
| 2016/0327021 A1 | 11/2016 | Tobin et al. |

FOREIGN PATENT DOCUMENTS

| | | |
|---|---|---|
| EP | 1944505 A1 | 7/2008 |
| EP | 2031241 A1 | 3/2009 |
| EP | 2444658 A1 | 4/2012 |
| EP | 2466122 A2 | 6/2012 |
| EP | 2484895 A1 | 8/2012 |
| EP | 2484896 A1 | 8/2012 |
| EP | 2484897 A1 | 8/2012 |
| EP | 2484898 A1 | 8/2012 |
| EP | 2548800 A1 | 1/2013 |
| EP | 2597300 A1 | 5/2013 |
| EP | 2799709 A1 | 11/2014 |
| EP | 2799710 A1 | 11/2014 |
| EP | 2942521 A1 | 11/2015 |
| WO | 2007/140771 A1 | 12/2007 |
| WO | 2013/014015 A2 | 1/2013 |
| WO | 2014198353 A1 | 12/2014 |
| WO | 2015/030573 A1 | 3/2015 |
| WO | 2015053768 A1 | 4/2015 |
| WO | WO-2015053768 A1 * | 4/2015 ........... F03D 7/0224 |

OTHER PUBLICATIONS

Extended European Search Report in EP Application No. 16173929.7, dated Apr. 4, 2017; 7pp.

Extended European Search Report in EP Application No. 16173927.1, dated Mar. 17, 2017; 7pp.

Office Action for Japanese Application No. 2015-222758 dated Feb. 7, 2017; 12pp.

Office Action for Japanese Application No. 2015-221838 dated Feb. 7, 2017; 14pp.

Office Action for U.S. Appl. No. 15/195,221 dated Oct. 5, 2018; 12pp.

* cited by examiner

BLADE SPANWISE DIRECTION

VORTEX GENERATOR, WIND TURBINE BLADE, AND WIND TURBINE POWER GENERATING APPARATUS

RELATED APPLICATIONS

The present application is a Continuation-in-Part of U.S. application Ser. No. 15/217,949, filed Jul. 22, 2016, which claims priority to Japanese Application Number 2015-221838 filed Nov. 12, 2015. The disclosures of all of the above-listed applications are hereby incorporated by reference herein in their entirety.

TECHNICAL FIELD

The present disclosure relates to a vortex generator, a wind turbine blade, and a wind turbine power generating apparatus.

BACKGROUND ART

Approaches to improve aerodynamic performance of a wind turbine blade have been sought for some time in context of improvement of operation efficiency of a wind turbine. In one of the approaches, a vortex generator is disposed on a surface of a wind turbine blade to suppress separation of a flow along the surface of the wind turbine blade.

Patent Documents 1 to 10 disclose a vortex generator having a platform portion to be mounted to a surface of a wind turbine blade, and a fin disposed upright on the platform portion.

CITATION LIST

Patent Literature

Patent Document 1: US Patent Application Publication No. 2014/0140856
Patent Document 2: EP2548800A
Patent Document 3: EP2799709A
Patent Document 4: WO2007/140771A
Patent Document 5: EP2484895A
Patent Document 6: EP2484896A
Patent Document 7: EP2484897A
Patent Document 8: EP2484898A
Patent Document 9: WO2015/030573A
Patent Document 10: EP2597300A

SUMMARY

The vortex generator disclosed in Patent Documents 1 to 10 may fall off from a surface of a wind turbine blade in response to a great stress applied to a platform portion due to deformation of the wind turbine blade. Operation of a wind turbine can be continued even after the vortex generator falls off from the wind turbine blade, but performance of the wind turbine may deteriorate.

An object of at least some embodiments of the present invention is to provide a vortex generator that is less likely to fall off from a surface of a wind turbine blade, as well as a wind turbine blade and a wind turbine power generating apparatus having the vortex generator.

(1) A vortex generator, according to at least some embodiments of the present invention, for a wind turbine blade to be mounted to a wind turbine blade, comprises: a platform portion to be mounted to a surface of the wind turbine blade; and at least one fin disposed upright on the platform portion. The platform portion has a cross section having a curved convex shape, at least along a blade spanwise direction of the wind turbine blade.

During operation of a wind turbine power generating apparatus, the wind turbine blade deforms flexurally due to bending deformation caused by an aerodynamic load. Thus, a great stress is applied to the platform portion mounted to the surface of the wind turbine blade.

In this regard, with the above configuration (1), the platform portion of the vortex generator has a cross section of a curved convex shape along the blade spanwise direction of the wind turbine blade, and thereby the platform portion is deformable in accordance with bending deformation of the wind turbine blade, and thereby it is possible to disperse stress generated at the platform portion. Thus, it is possible to reduce a risk of falling off of the vortex generator from the surface of the wind turbine blade.

(2) In some embodiments, in the above configuration (1), the platform portion has a cross section having a curved convex shape, along a chordwise direction of the wind turbine blade.

With the above configuration (2), even if the wind turbine blade should torsionally deform during operation of the wind turbine power generating apparatus, the platform portion can deform in accordance with the torsional deformation of the wind turbine blade and thus it is possible to disperse stress applied to the platform portion. Thus, it is possible to reduce a risk that the vortex generator falls off from the surface of the wind turbine blade even further.

(3) In some embodiments, in the above configuration (1) or (2), the platform portion has a cross section having a curved convex shape within a region excluding a connection part at which the at least one fin connects to the platform portion, along any direction orthogonal to the surface of the wind turbine blade.

With the above configuration (3), the platform portion deforms in accordance with complicated deformation of the wind turbine blade, and thereby it is possible to disperse stress applied to the platform portion. Thus, it is possible to reduce a risk that the vortex generator falls off from the surface of the wind turbine blade even further.

(4) In some embodiments, in any of the above configurations (1) to (3), the platform portion has a circular shape or an oval shape in a top view.

With the above configuration (4), it is possible to disperse stress applied to the platform portion due to deformation of the wind turbine blade effectively, and to reduce a risk that the vortex generator falls off from the surface of the wind turbine blade even further.

(5) In some embodiments, in any of the above configurations (1) to (4), the platform portion has a back surface to face the surface of the wind turbine blade, and the back surface has a larger curvature along the chordwise direction than a curvature of the surface of the wind turbine blade at a mounting position of the platform portion along the chordwise direction.

With the above configuration (5), it is possible to improve an adhesion property of the platform portion to the surface of the wind turbine blade, and to reduce a risk of falling off of the vortex generator even further.

(6) In an embodiment, in the above configuration (5), the back surface of the platform portion has a larger curvature along the chordwise direction than a curvature of the surface of the wind turbine blade along the chordwise direction at a maximum chord-length position of the wind turbine blade.

At the side of the blade root of the wind turbine blade, it is desirable to improve the maximum lift coefficient Clmax to make up for shortage of an actual chord length with respect to the optimum blade chord length. For this purpose, an effective approach is to mount the vortex generator to a region in the vicinity of the maximum chord-length position to suppress separation of a flow along the surface of the wind turbine blade.

With the above configuration (6), even if the vortex generator is to be mounted to a region in the vicinity of the maximum chord-length position of the wind turbine blade (a region having a larger curvature on the surface of the blade body along the chordwise direction than at the side of the blade tip) to improve the maximum lift coefficient, it is possible to ensure an adhesive property of the platform portion to the surface of the wind turbine blade appropriately.

(7) In some embodiments, in the above configuration (5) or (6), the vortex generator further comprises an adhesive-agent layer for filling at least a gap between the back surface of the platform portion and the surface of the wind turbine blade, and fixing the platform portion to the surface of the wind turbine blade.

According to the above configuration (7), with the adhesive-agent layer formed in a gap between the back surface of the platform portion and the surface of the wind turbine blade, it is possible to enhance an adhesion property of the platform portion to the surface of the wind turbine blade, and to expect the adhesive-agent layer to achieve an effect to mitigate stress, which makes it possible to reduce the risk of falling off of the vortex generator even further.

(8) In some embodiments, in any one of the above configurations (1) to (7), the at least one fin has a root portion which is to be connected to the platform portion and which has a fillet.

With the above configuration (8), it is possible to reduce stress concentration at a connection part between the root portion of the fin and the platform portion, and enhance the strength of the vortex generator.

(9) In some embodiments, in any one of the above configurations (1) to (8), the at least one fin comprises a pair of fins disposed on the platform portion.

A plurality of fins may be disposed along the blade spanwise direction to constitute the vortex generator. Accordingly, it is possible to benefit from an effect to suppress separation achieved by the vortex generators in a wider range with respect to the blade spanwise direction. In this case, if the number of the fins per platform portion is increased, it is possible to mount the vortex generators to the wind turbine blade efficiently, but on the other hand, the length of the platform portion along the blade spanwise direction increases, which may lead to an increase in the risk of falling off of the vortex generators due to stress applied to the platform portion by bending deformation of the wind turbine blade.

In this regard, with the above configuration (9), the number of fins disposed on the platform portion is limited to two, and the platform portion has a cross section of a curved convex shape with respect to the blade spanwise direction, as described in the above (1), and thereby it is possible to reduce the risk of falling off of the vortex generators from the surface of the wind turbine blade effectively.

(10) In some embodiments, in any of the above configurations (1) to (9), the vortex generator is disposed on a suction surface of the wind turbine blade and within a turbulent flow region of a wind flow along the suction surface.

Separation of a flow at the suction surface of the wind turbine blade takes place due to a boundary layer becoming gradually thicker from a streamline flow region in the vicinity of the leading edge toward a turbulent flow region downstream thereof, and the flow being separated before arriving at the trailing edge.

In this regard, with the above configuration (10), the vortex generator is disposed within a turbulent flow region of a wind flow along the suction surface, and thereby it is possible to suppress separation of a flow from the suction surface.

(11) A wind turbine blade according to at least some embodiments of the present invention comprises: a wind turbine blade; and the vortex generator according to any one of the above (1) to (10), disposed on a surface of the blade body.

With the above configuration (11), as described in the above (1), the platform portion of the vortex generator has a cross section of a curved convex shape along the blade spanwise direction of the wind turbine blade, and thereby the platform portion is deformable in accordance with bending deformation of the wind turbine blade, which makes it possible to disperse stress generated at the platform portion. Thus, it is possible to reduce a risk of falling off of the vortex generator from the surface of the wind turbine blade, and to benefit from an effect to improve efficiency of a wind turbine blade achieved by the vortex generator for a long time.

(12) A wind turbine power generating apparatus according to at least some embodiments of the present invention includes the wind turbine blade according to the above configuration (11).

With the above configuration (12), due to provision of the wind turbine blade having the above configuration (11), it is possible to reduce a risk of falling off of the vortex generator from the surface of the wind turbine blade, and to benefit from an effect to improve efficiency of a wind turbine power generating apparatus achieved by the vortex generator for a long time.

According to at least one embodiment of the present invention, it is possible to disperse stress applied to the platform portion of the vortex generator, and thus to reduce a risk that the vortex generator falls off from the surface of the wind turbine blade.

DETAILED DESCRIPTION

Embodiments of the present invention will now be described in detail with reference to the accompanying drawings. It is intended, however, that unless particularly specified, dimensions, materials, shapes, relative positions and the like of components described in the embodiments shall be interpreted as illustrative only and not intended to limit the scope of the present invention.

Figure 1:
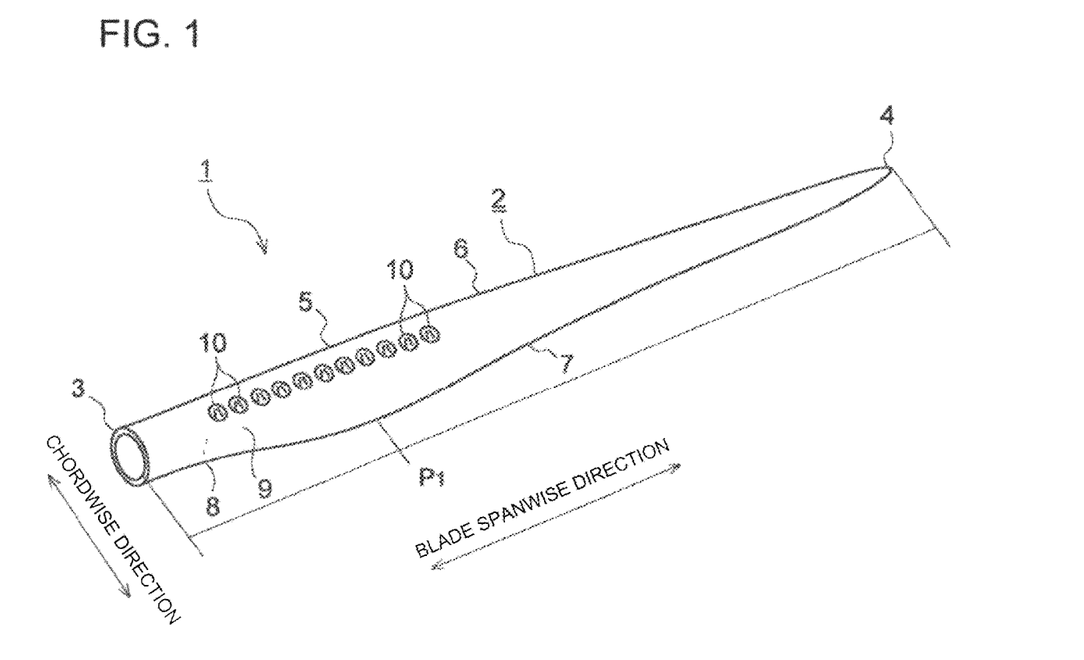
FIG. 1 is a perspective view of a wind turbine blade having a vortex generator according to an embodiment.

Firstly, with reference to FIG. 1, the overall configuration of a wind turbine blade 1 according to some embodiments will be described. FIG. 1 is a perspective view of the wind turbine blade 1 having a vortex generator 10 according to an embodiment.

The wind turbine blade 1 according to some embodiments includes a blade body 2 and the vortex generator 10 mounted to a surface (blade surface) of the blade body 2.

The blade body 2 includes a blade root 3 to be attached to a hub of a wind turbine power generating apparatus, a blade tip 4 positioned farthest from the hub, and an airfoil part 5 extending between the blade root 3 and the blade tip 4. The wind turbine blade 1 has a leading edge 6 and a trailing edge 7 from the blade root 3 to the blade tip 4. Further, an exterior shape of the wind turbine blade 1 is formed by a pressure surface 8 and a suction surface 9 disposed opposite to the pressure surface 8.

Hereinafter, "blade spanwise direction" refers to a direction oriented from the blade root 3 toward the blade tip 4, and "chordwise direction" refers to a direction along a line (chord) connecting the leading edge 6 and the trailing edge 7.

In an embodiment, the wind turbine power generating apparatus having the above wind turbine blade 1 includes a plurality of wind turbine blades 1 mounted to a hub in a radial fashion, so that a rotor (which includes the wind turbine blades 1 and the hub) rotates in response to wind received by the plurality of wind turbine blades 1, and a generator coupled to the rotor generates electric power.

Next, the vortex generator 10 according to some embodiments will be described in detail with reference to FIGS. 2 to 9.

Figure 2:
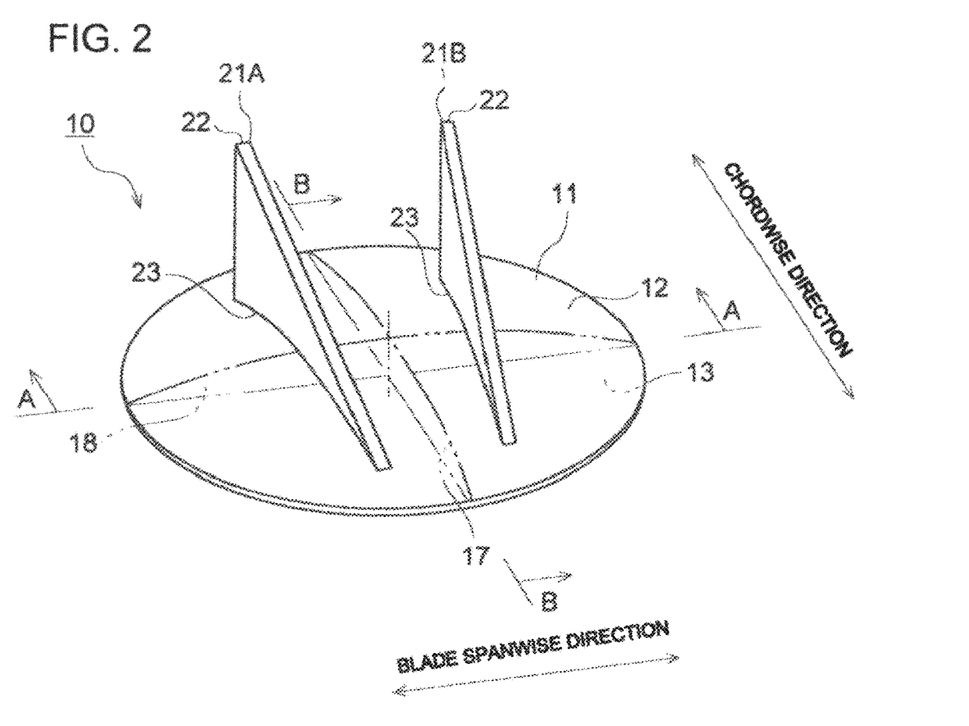
FIG. 2 is a perspective view of a vortex generator according to an embodiment.
Figure 8:
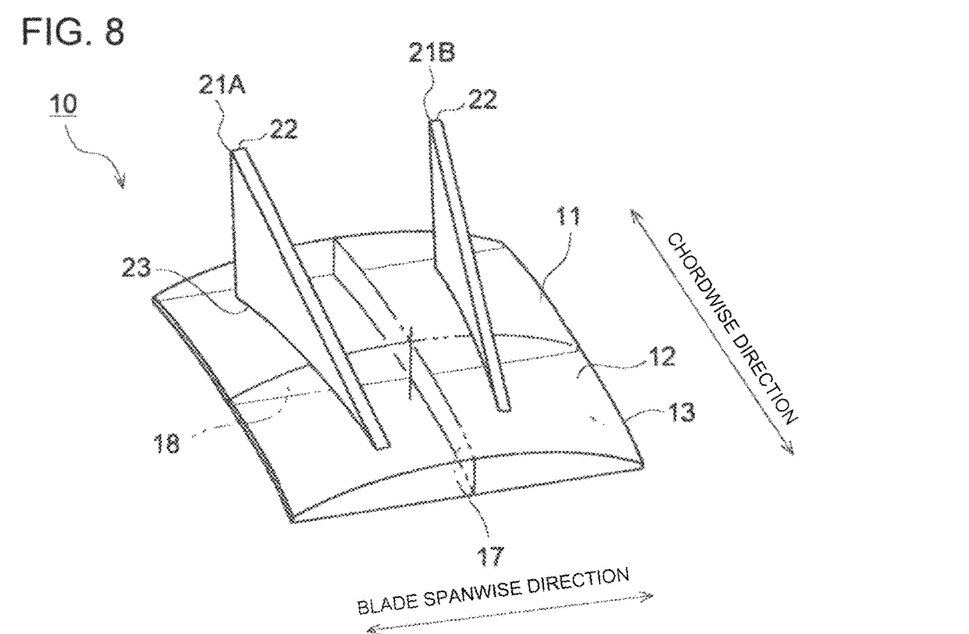
FIG. 8 is a perspective view of a vortex generator according to another embodiment.
Figure 9:
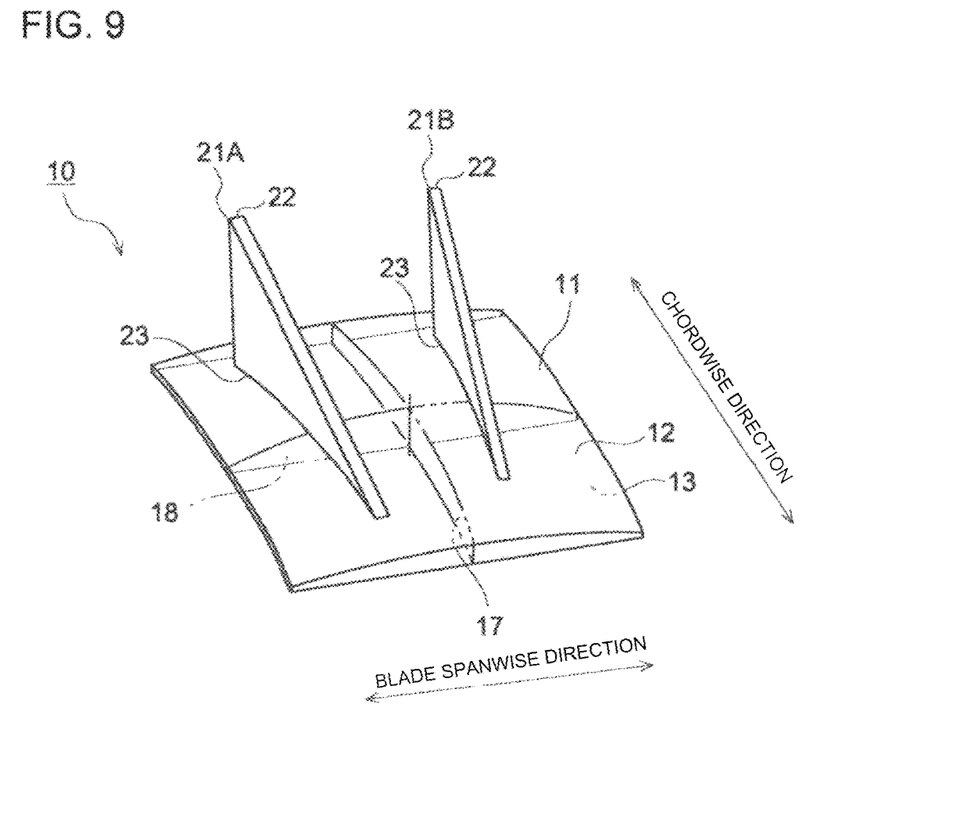
FIG. 9 is a perspective view of a vortex generator according to yet another embodiment.

FIG. 2 is a perspective view of the vortex generator 10 according to an embodiment. FIG. 8 is a perspective view of the vortex generator 10 according to another embodiment. FIG. 9 is a perspective view of the vortex generator 10 according to yet another embodiment. In these drawings, the double-dotted chain lines are virtual lines used to help understand the shape of the vortex generator 10.

As depicted in FIGS. 2, 8 and 9, the vortex generator 10 according to some embodiments includes a platform portion 11 to be mounted to a surface of the wind turbine blade 1 (more specifically, to a surface of the blade body 2) and at least one fin 21 (21A, 21B) disposed upright on the platform portion 11. The platform portion 11 has a front surface 12 exposed to outside and a back surface 13 facing the surface of the blade body 2.

In an embodiment, the wind turbine blade 1 is provided with a plurality of the vortex generators 10 including the fin 21 and the platform portion 11, and the vortex generators 10 are arranged in the blade spanwise direction.

Figure 3:
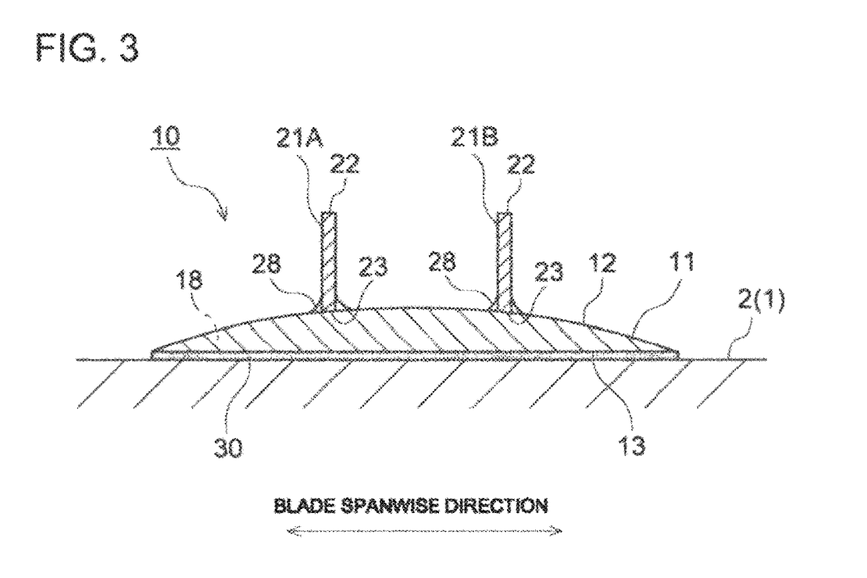
FIG. 3 is a cross-sectional view of a vortex generator according to an embodiment, taken along a blade spanwise direction (along line A-A in FIG. 2).
Figure 5:
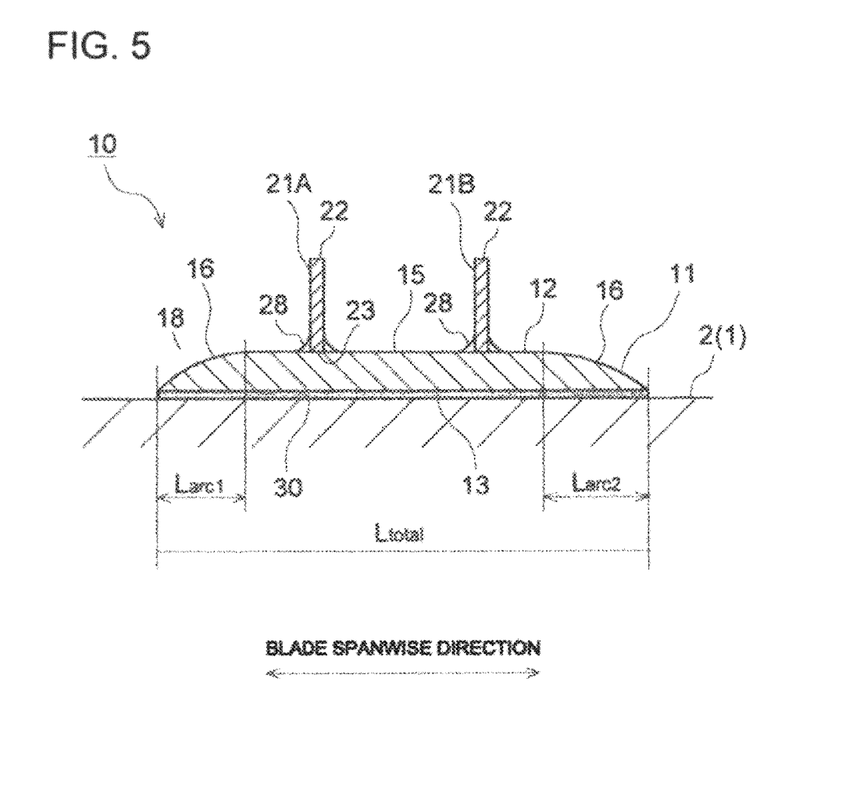
FIG. 5 is a cross-sectional view of a vortex generator according to another embodiment taken along a blade spanwise direction, corresponding to a cross section taken along line A-A in FIG. 2.

In FIGS. 3 and 5, depicted is a cross section 18 of the platform portion 11 of the vortex generator 10 taken along the blade spanwise direction. FIG. 3 is a cross-sectional view of the vortex generator 10 according to an embodiment, taken along a blade spanwise direction (along line A-A in FIG. 2). FIG. 5 is a cross-sectional view of the vortex generator 10 according to another embodiment taken in a blade spanwise direction, corresponding to a cross section taken along line A-A in FIG. 2.

As depicted in FIGS. 3 and 5, at least the cross section 18 of the platform portion 11 of the vortex generator 10 according to some embodiments taken along the blade spanwise direction of the wind turbine blade 1 has a curved convex shape.

Herein, "curved convex shape" refers to a shape that bulges in a direction away from the wind turbine blade 1 to have a bulged portion with a curved profile (the shape of the front surface 12 of the platform portion 11).

The profile of the bulged portion may be formed by an arc having a single curvature radius as in the embodiment depicted in FIG. 3, or may be formed by combination of a plurality of arcs having different curvature radii as in another non-depicted embodiment.

Further, as in yet another embodiment depicted in FIG. 5, the profile of the bulged portion of the platform portion 11 may be formed by combination of a curved portion 16 of an arc shape and a straight portion 15 of a linear shape.

During operation of a wind turbine power generating apparatus, the wind turbine blade 1 deforms flexurally due to bending deformation caused by an aerodynamic load. Thus, a great stress is applied to the platform portion 11 mounted to the surface of the wind turbine blade 1.

In this regard, according to the above embodiment, the platform portion 11 of the vortex generator 10 has the cross section 18 of a curved convex shape along the blade spanwise direction of the wind turbine blade 1, and thereby the platform portion 11 is deformable in accordance with bending deformation of the wind turbine blade 1, which makes it possible to disperse stress generated at the platform portion 11. Thus, it is possible to reduce a risk of falling off of the vortex generator 10 from the surface of the wind turbine blade 1.

In some embodiments, as depicted in FIG. 5, an expression of Larc≥0.5 Ltotal is satisfied, where Larc (Larc1+Larc2) is a sum of lengths, with respect to the blade spanwise direction, of regions formed by at least one curved portion (arc shape) 16 of a profile of a bulged portion of the platform portion 11 including combination of the curved portion 16 and the straight portion 15, and Ltotal is the entire length of the platform portion 11 in the cross section 18 with respect to the blade spanwise direction. Specifically, the platform portion 11 includes the straight portion 15 disposed in a center region and two curved portions 16, 16 disposed on the opposite sides with respect to the blade spanwise direction, in the cross section 18 taken along the blade spanwise direction. In this configuration, the sum of the length Larc1 of one of the curved portions 16, with respect to the blade spanwise direction, and the length Larc2 of another one of the curved portions 16, with respect to the blade spanwise direction, is at least 0.5 times the entire length Ltotal of the platform portion 11 with respect to the blade spanwise direction.

In an embodiment, an expression of Larc≥0.2 Ltotal may be satisfied, and for instance, 0.7 Ltotal may be satisfied.

Figure 4A:
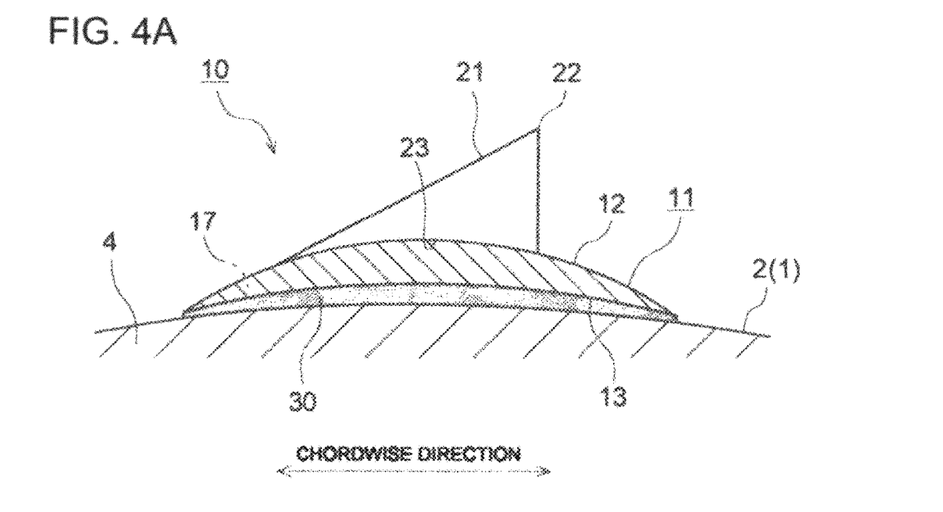
FIG. 4A is a cross-sectional view of a vortex generator at a blade tip side, according to an embodiment, taken along a chordwise direction (along line B-B in FIG. 2).
Figure 4B:
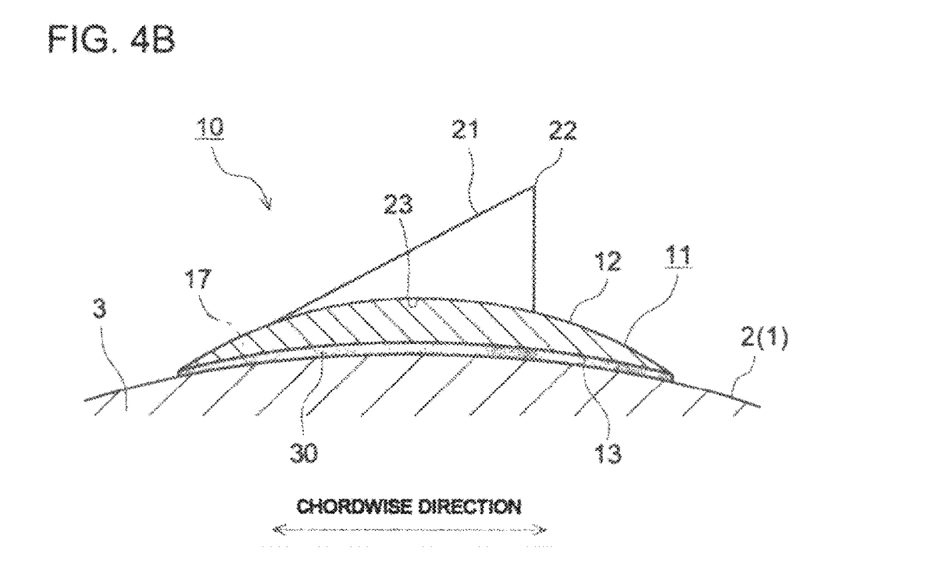
FIG. 4B is a cross-sectional view of a vortex generator at a blade root side, according to an embodiment, taken along a chordwise direction (along line B-B in FIG. 2).

In FIGS. 4A and 4B, depicted is a cross section 17 of the vortex generator 10 taken along the chordwise direction. FIG. 4A is a cross-sectional view of the vortex generator 10 at the side of the blade tip 4 according to an embodiment, taken along a chordwise direction (along line B-B in FIG. 2). FIG. 4B is a cross-sectional view of the vortex generator 10 at the side of the blade root 3 according to an embodiment, taken along a chordwise direction (along line B-B in FIG. 2). In FIG. 4B, shown is a cross section at the maximum chord-length position $P_1$.

As depicted in FIGS. 4A and 4B, the cross section 17 of the platform portion 11 of the vortex generator 10 according to some embodiments taken along the chordwise direction of the wind turbine blade 1 has a curved convex shape.

Herein, similarly to the curved convex shape in the blade spanwise direction described above, "curved convex shape" refers to a shape that bulges in a direction away from the wind turbine blade 1 to have a bulged portion with a curved profile (the shape of the front surface 12 of the platform portion 11).

The profile of the bulged portion may be formed by an arc having a single curvature radius as in the embodiment depicted in FIGS. 4A and 4B, or may be formed by combination of a plurality of arcs having different curvature radii as in another non-depicted embodiment. Further, the profile of the bulged portion of the platform portion 11 may be formed by combination of a curved portion of an arc shape and a straight portion of a linear shape (see FIG. 5).

According to this embodiment, even if the wind turbine blade 1 should torsionally deform during operation of the wind turbine power generating apparatus, the platform portion can deform in accordance with the torsional deformation of the wind turbine blade 1 and thus it is possible to disperse stress applied to the platform portion 11. Thus, it is possible to reduce a risk that the vortex generator 10 falls off from the surface of the wind turbine blade 1 even further.

As depicted in FIG. 2, in an embodiment, the platform portion 11 has a cross section of a curved convex shape in a region excluding a connection part between the platform portion 11 and the fin 21, along any direction orthogonal to the surface of the wind turbine blade 1.

Accordingly, the platform portion 11 deforms in accordance with complicated deformation of the wind turbine blade 1, and thereby it is possible to disperse stress applied to the platform portion 11. Thus, it is possible to reduce a risk that the vortex generator 10 falls off from the surface of the wind turbine blade 1 even further.

As depicted in FIGS. 4A and 4B, a curvature, along the chordwise direction, of the back surface 13 of the platform portion 11 facing the surface of the wind turbine blade 1 may be larger than a curvature, along the chordwise direction, of the surface of the wind turbine blade 1 (blade body 2) at the mounting position of the platform portion 11.

Accordingly, it is possible to enhance an adhesion property of the platform portion 11 to the surface of the wind turbine blade 1, and it is possible to reduce a risk of falling off of the vortex generator 10 even further.

Further, the curvature along the chordwise direction of the back surface 13 of the platform portion 11 may be larger than the curvature along the chordwise direction of the surface of the wind turbine blade 1 at the maximum chord-length position $P_1$. Herein, the maximum chord-length position $P_1$ refers to a position, with respect to the blade spanwise direction, at which the chord length reaches its maximum within the wind turbine blade 1 depicted in FIG. 1.

At the side of the blade root 3 of the wind turbine blade 1, it is desirable to improve the maximum lift coefficient Clmax to make up for shortage of an actual chord length with respect to the optimum blade chord length. For this purpose, an effective approach is to mount the vortex generator 10 to a region in the vicinity of a maximum chord-length position to suppress separation of a flow along the surface of the wind turbine blade 1.

According to this embodiment, even if the vortex generator 10 is to be mounted to a region in the vicinity of the maximum chord-length position of the wind turbine blade 1 (a region having a larger curvature on the surface of the blade body 2 along the chordwise direction than at the side of the blade tip 4) to improve the maximum lift coefficient, it is possible to ensure an adhesive property of the platform portion 11 to the surface of the wind turbine blade 1 appropriately.

In the embodiment depicted in FIG. 1, the vortex generators 10 are disposed in a region at the side of the blade root 3 to make up for shortage of the actual chord length with respect to the optimum chord length of the wind turbine blade 1. However, a region to dispose the vortex generators 10 is not limited to this. For instance, the vortex generators 10 may be disposed in a region at the side of the blade tip 4, or in a region which is a substantial part of a range from the blade root 3 to the blade tip 4 with respect to the blade spanwise direction.

Figure 6:
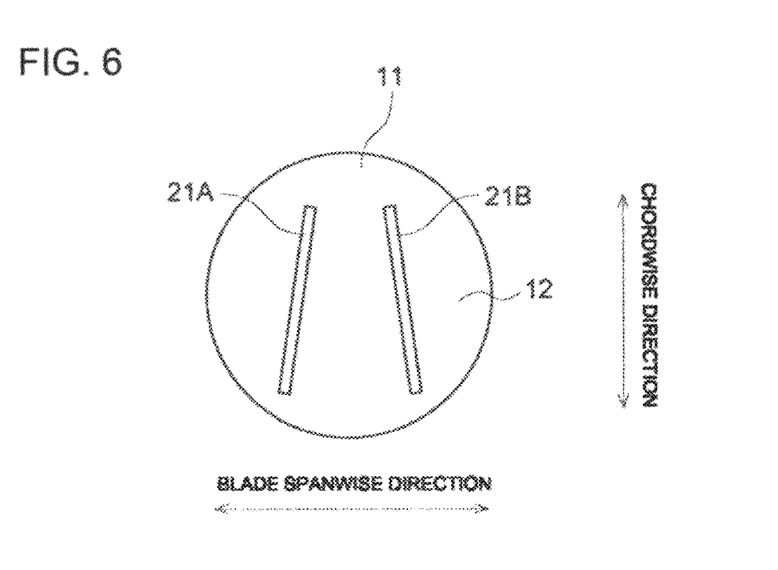
FIG. 6 is a top view of a vortex generator according to an embodiment.
Figure 7:
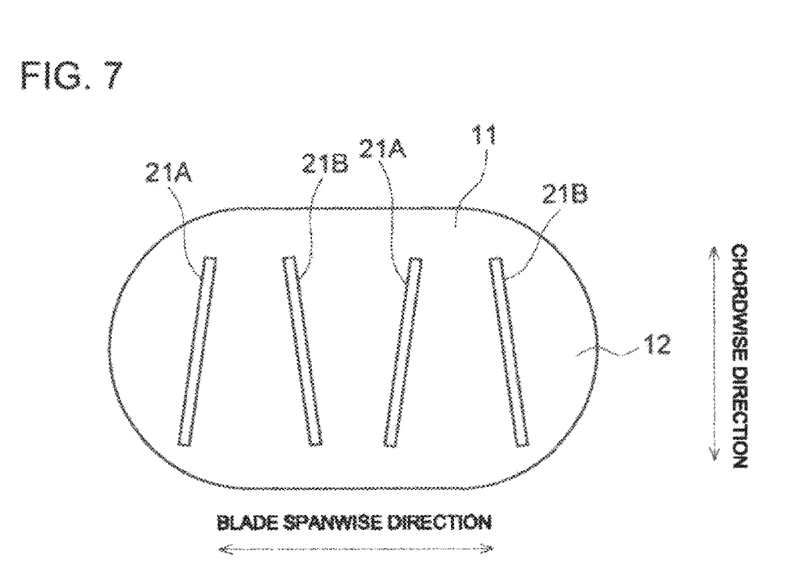
FIG. 7 is a top view of a vortex generator according to another embodiment.

Further, as depicted in FIG. 6 or 7, the platform portion 11 may have a circular shape or an oval shape in a top view.

FIG. 6 is a top view of the vortex generator 10 according to an embodiment. The platform portion 11 of the vortex generator 10 has a circular shape in a top view. In this case, a pair of fins 21A, 21B may be disposed on the platform portion 11.

FIG. 7 is a top view of the vortex generator 10 according to another embodiment. The platform portion 11 of the vortex generator 10 has an oval shape in a top view. In this case, a plurality of pairs of fins 21A, 21B may be disposed on the platform portion 11. In the depicted example, two pairs of fins 21A, 21B are provided.

With these configurations, it is possible to disperse stress applied to the platform portion 11 due to deformation of the wind turbine blade 1 effectively, and to reduce a risk that the vortex generator 10 falls off from the surface of the wind turbine blade 1 even further.

It should be noted that the shape of the platform portion 11 is not limited to a circular shape or an oval shape.

For instance, as depicted in FIG. 8 or 9, in another embodiment, the platform portion 11 may have a polygonal shape in a top view.

In the embodiment depicted in FIG. 8, the platform portion 11 has a rectangular shape in a top view. Further, in the blade spanwise direction, the cross section 18 of the platform portion 11 has a curved convex shape.

In the embodiment depicted in FIG. 9, the platform portion 11 has a rectangular shape in a top view. Further, in both of the chordwise direction and the blade spanwise direction, the cross sections 17, 18 of the platform portion 11 have a curved convex shape.

In the embodiment depicted in FIG. 6, at least one fin 21 comprises a pair of fins 21A, 21B disposed on the platform portion 11.

A plurality of fins 21 may be disposed along the blade spanwise direction to constitute the vortex generators 10. Accordingly, it is possible to benefit from an effect to suppress separation achieved by the vortex generators 10 in a wider range with respect to the blade spanwise direction. In this case, if the number of the fins 21 per platform portion 11 is increased, it is possible to mount the vortex generators 10 to the wind turbine blade 1 efficiently, but on the other hand, the length of the platform portion 11 along the blade spanwise direction increases, which may lead to an increase in the risk of falling off of the vortex generators 10 due to stress applied to the platform portion 11 by bending deformation of the wind turbine blade 1.

In this regard, with the above configuration, the number of fins disposed on the platform portion 11 is limited to two, and the platform portion 11 has the cross section 18 (see FIG. 3) of a curved convex shape with respect to the blade spanwise direction, and thereby it is possible to reduce the risk of falling off of the vortex generators 10 from the surface of the wind turbine blade 1 effectively.

As depicted in FIGS. 2, 8, and 9, the fins 21 (21A, 21B) are formed into a substantially-triangle plate shape, and include a distal end portion 22 protruding in a direction away from the platform portion 11 and a root portion 23 to be mounted to the platform portion 11. The pair of fins 21A, 21B are disposed substantially parallel to each other, but slightly oblique so as to form an angle of more than 0° between the respective surfaces. Specifically, the fins 21A, 21B are disposed so that a gap between the fins 21A, 21B expands from the side of the leading edge 6 toward the side of the trailing edge 7 of the wind turbine blade 1 depicted in FIG. 1. Further, the fins 21A, 21B have an inclined shape such that the distal end portion 22 is disposed on the side of the leading edge 6, and the height decreases from the distal end portion 22 toward the trailing edge 7.

In the embodiment depicted in FIGS. 3 to 5, the vortex generator 10 further includes an adhesive-agent layer 30 for filling at least a gap between the back surface 13 of the platform portion 11 and the surface of the blade body 2 of the wind turbine blade 1, and fixing the platform portion 11 to the surface of the blade body 2.

Accordingly, with the adhesive-agent layer 30 formed in a gap between the back surface 13 of the platform portion 11 and the surface of the blade body 2, it is possible to enhance an adhesion property of the platform portion 11 to the surface of the blade body 2, and to expect the adhesive-agent layer 30 to achieve an effect to mitigate stress, which makes it possible to reduce the risk of falling off of the vortex generator 10 even further.

In the embodiment depicted in FIGS. 3 and 5, the root portions 23 of the fins 21 (21A, 21B) to be connected to the platform portion 11 have a fillet 28. For instance, the fillets 28 may be formed in advance on the root portions 23 of the fins 21 (21A, 21B) of the vortex generator 10, and the fins 21 with the root portions 23 may be joined to the platform portion 11, whereby the fillets 28 are obtained on the root portions 23 of the fins 21 of the vortex generator 10. Alternatively, the fillets 28 may be formed in advance on the platform portion 11, and the fins 21 (21A, 21B) may be joined to the platform portion 11, whereby the fillets 28 are obtained on the root portions 23 of the fins 21 of the vortex generator 10. If the fins 21 (21A, 21B) are to be joined to the platform portion 11 by using an adhesive agent, the fins 21 and the platform portion 11 may be each formed from FRP.

As depicted in FIG. 1, in an embodiment, the vortex generator 10 is disposed within a turbulent flow region of a wind flow along the suction surface 9, on the suction surface 9 of the wind turbine blade 1.

Separation of a flow at the suction surface 9 of the wind turbine blade 1 takes place due to a boundary layer becoming gradually thicker from a streamline flow region in the vicinity of the leading edge 6 toward a turbulent flow region downstream thereof, and the flow being separated before arriving at the trailing edge 7.

In this regard, with the above configuration, the vortex generator 10 is disposed within a turbulent flow region of a wind flow along the suction surface 9, and thereby it is possible to suppress separation of a flow from the suction surface 9.

A wind turbine power generating apparatus according to some embodiments includes the vortex generator 10 according to any one of the above described embodiments.

Accordingly, it is possible to reduce a risk of falling off of the vortex generator 10 from the surface of the wind turbine blade 1, and to benefit from an effect to improve efficiency of a wind turbine power generating apparatus achieved by the vortex generator 10 for a long time.

As described above, according to at least some embodiments of the present invention, it is possible to disperse stress applied to the platform portion 11 of the vortex generator 10, and thus to reduce the risk that the vortex generator 10 falls off from the surface of the wind turbine blade 1 (more specifically, of the blade body 2).

Figure 10:
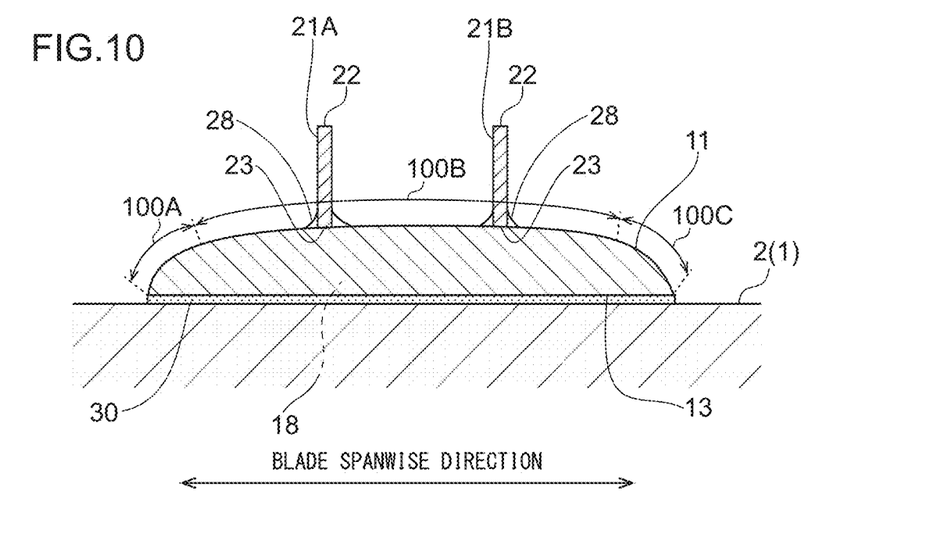
FIG. 10 is a cross-sectional view of a vortex generator according to an embodiment, taken along a blade spanwise direction.

FIG. 10 is a cross-sectional view of a vortex generator according to an embodiment, taken along a blade spanwise direction.

As shown in FIG. 10, the cross section 18 of the platform portion 11 of the vortex generator 10 according to some embodiments taken along the blade spanwise direction of the wind turbine blade 1 has a curved convex shape. The profile of the curved convex shape of the platform portion 11 is formed by combination of a plurality of arcs 100 (100A, 100B and 100C). Although, in the illustrated example, the number of arcs 100 is three, the number of arcs forming the profile is not limited to this example.

The arcs 100 forming the profile have different curvature radii. In the example shown in FIG. 10, the arc 100B corresponding to a region of the platform 11 on which at least one fin 21 (21A, 21B) is disposed has a curvature radius greater than that of the other arcs 100A and 100C on both sides of the arc 100B.

Embodiments of the present invention were described in detail above, but the present invention is not limited thereto, and various amendments and modifications may be implemented.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

The invention claimed is:

1. A vortex generator for a wind turbine blade to be mounted to a wind turbine blade, comprising:

a platform portion to be immovably mounted to a surface of the wind turbine blade, the platform having a circular shape in a top view; and at least two fins immovably fixed to and disposed upright on the platform portion, wherein the platform portion has a cross section having a curved convex shape between adjacent fins of the at least two fins, at least along a blade spanwise direction of the wind turbine blade.

2. The vortex generator for a wind turbine blade according to claim 1, wherein the platform portion has a cross section having a curved convex shape, along a chordwise direction of the wind turbine blade.

3. The vortex generator for a wind turbine blade according to claim 1, wherein the platform portion has a cross section having a curved convex shape within a region excluding a connection part at which each of the at least two fins connects to the platform portion, along any direction orthogonal to the surface of the wind turbine blade.

4. The vortex generator for a wind turbine blade according to claim 1, wherein the platform portion has a back surface to face the surface of the wind turbine blade, and the back surface has a larger curvature along the chordwise direction than a curvature of the surface of the wind turbine blade at a mounting position of the platform portion along the chordwise direction.

5. The vortex generator for a wind turbine blade according to claim 4, wherein the back surface of the platform portion has a larger curvature along the chordwise direction than a curvature of the surface of the wind turbine blade at a maximum chord-length position of the wind turbine blade along the chordwise direction.

6. The vortex generator for a wind turbine blade according to claim 4, further comprising an adhesive-agent layer for filling at least a gap between the back surface of the platform portion and the surface of the wind turbine blade, and fixing the platform portion to the surface of the wind turbine blade.

7. The vortex generator for a wind turbine blade according to claim 1, wherein each of the at least two fins has a root portion which is to be connected to the platform portion and which has a fillet.

8. The vortex generator for a wind turbine blade according to claim 1, disposed on a suction surface of the wind turbine blade and within a turbulent flow region of a wind flow along the suction surface.

9. A wind turbine blade, comprising:

a blade body; and the vortex generator according to claim 1, disposed on a surface of the blade body.

10. A wind turbine power generating apparatus including the wind turbine blade according to claim 9.

11. The vortex generator for a wind turbine blade according to claim 1, wherein each of the at least two fins includes:

a leading edge;

a trailing edge;

a pair of fin surfaces extending along a fin chord direction to connect the leading edge and the trailing edge, wherein a root portion of each of the at least two fins is connected to the platform portion over an entire region in the fin chord direction between the leading edge and the trailing edge.

12. A vortex generator for a wind turbine blade to be mounted to a wind turbine blade, comprising:

a platform portion to be immovably mounted to a surface of the wind turbine blade; and at least two fins immovably fixed to and disposed upright on the platform portion, wherein the platform portion has a cross section having a curved convex shape, at least along a blade spanwise direction of the wind turbine blade, wherein the curved convex shape is defined by an outer surface of a profile formed by combination of a plurality of arcs having different curvature radii, and wherein the profile is formed by one or more of the plurality of arcs between adjacent fins of the at least two fins.

13. A wind turbine blade, comprising:

a blade body; and the vortex generator according to claim 12, disposed on a surface of the blade body.

14. A wind turbine power generating apparatus including the wind turbine blade according to claim 13.

15. The vortex generator for a wind turbine blade according to claim 12, wherein each of the at least two fins includes:

a leading edge;

a trailing edge;

a pair of fin surfaces extending along a fin chord direction to connect the leading edge and the trailing edge, wherein a root portion of each of the at least two fins is connected to the platform portion over an entire region in the fin chord direction between the leading edge and the trailing edge.

* * * * *